Nov. 8, 1949  F. WALLER  2,487,620
DESICCATOR
Filed March 8, 1946
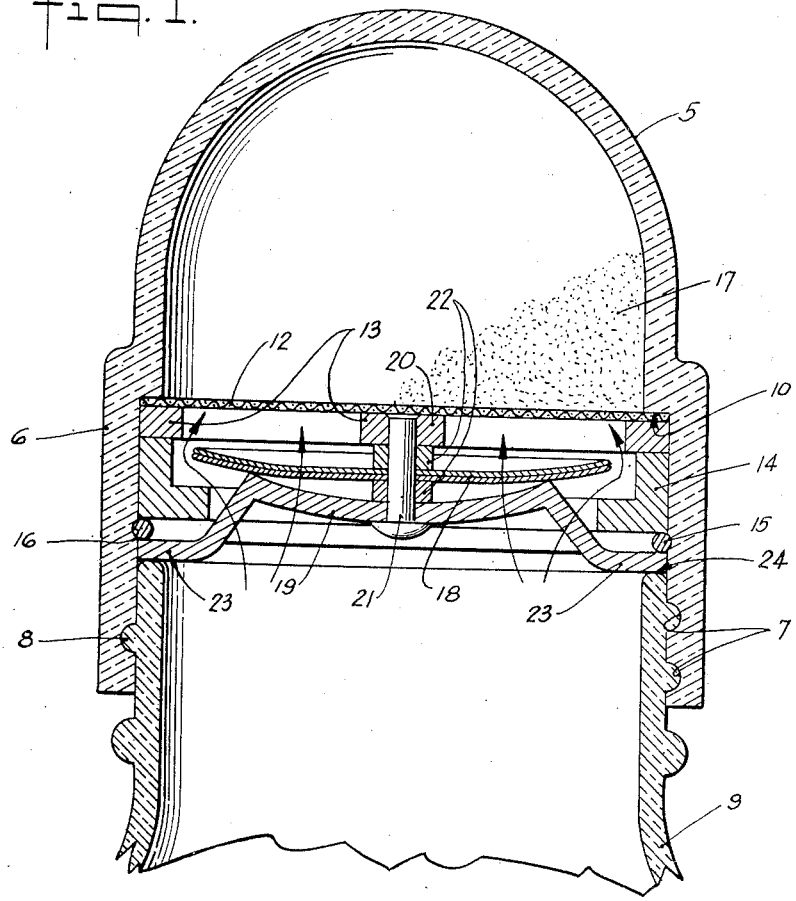
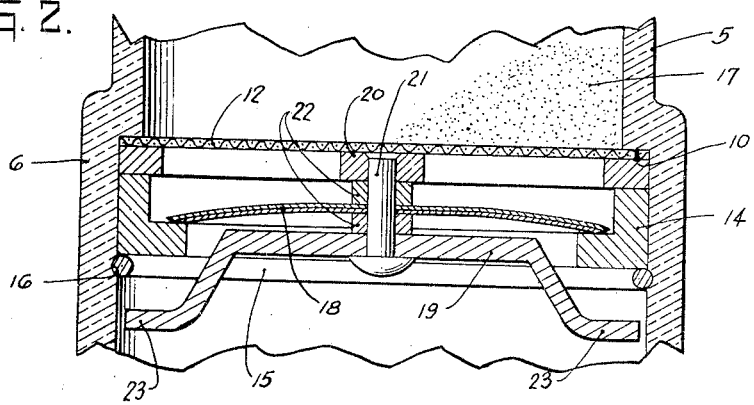
INVENTOR
FRED WALLER
BY
ATTORNEY Patented Nov. 8, 1949

2,487,620

UNITED STATES PATENT OFFICE 2,487,620

DESICCATOR

Fred Waller, Huntington, N. Y.

Application March 8, 1946, Serial No. 653,217

7 Claims. (Cl. 312—31.1)

This invention relates to desiccators for food jars, containers for chemicals, etc., and has for its object to provide a novel and improved device of this type.

Another object of the invention is to provide a simple and inexpensive desiccating stopper or cover which may be applied to existing types of jars, bottles and other containers to keep the contents dry, and is protected against absorption of outside moisture when removed from the container.

Another object is to provide a self-contained desiccating stopper of the foregoing type which will display an indication of its own moisture content, and which, when saturated, may be revivified by the simple process of heating without dismantling or manual manipulation of any kind.

Various other objects and advantages will be apparent as the nature of the invention is more fully disclosed.

For purposes of illustration, I shall describe the invention as applied to a stopper for a conventional Mason jar containing a food product which it is desired to maintain in a dry state, although it will be evident as the description proceeds that it is equally applicable to a variety of other forms and uses.

In the specific embodiment disclosed herein, my desiccating stopper comprises a cylindrical skirt portion which may be internally threaded for attachment to the threaded neck of a conventional food jar, and a transparent top or dome containing a hygroscopic material such as an indicating type of silica gel which has the property of changing its color according to the amount of moisture absorbed thereby.

The desiccant such as the above mentioned silica gel is confined in the dome of the stopper by a screen, and access of air thereto is controlled by a valve assembly including a bimetallic disc which is automatically flexed to admit air to the dome when the stopper is secured on the jar, but seals the dome off from the outside atmosphere when the stopper is removed from the jar. As a result, the desiccant will absorb moisture from the interior of the jar when the stopper is secured on the jar, but it will not absorb moisture from the outside atmosphere when off the jar.

Whenever the desiccant has absorbed its full capacity of moisture from within the jar, this condition will be evident from the distinctive color of the desiccant which will show through the transparent dome of the stopper, or from the increased weight of the desiccant, indicating that the desiccant needs to be revivified. In order to reactivate the desiccant, the stopper is simply removed from the jar and heated as by placing in an oven. The high temperature of the oven flexes the bimetallic disc and opens the dome of the stopper to the atmosphere of the oven, thus soon drying the desiccant and causing it to reacquire the distinctive color associated with such dry condition. When the stopper is removed from the oven and cooled, the thermo-sensitive bimetallic disc reassumes its sealing position so that the desiccant will not be exposed to the atmosphere and will not reopen until the stopper is again secured on the jar as previously described.

Although the novel features which are characteristic of this invention are set forth more in detail in the claims appended hereto, the nature and scope of the invention may be better understood by referring to the following description, taken in connection with the accompanying drawing forming a part thereof, in which a specific embodiment has been set forth for purposes of illustration.

In the drawing:

Fig. 1 is a vertical sectional view of a desiccating stopper embodying the present invention, showing same secured on the neck of a conventional food jar; and Fig. 2 is a broken sectional view of the stopper as it appears when removed from the jar.

In the following description certain specific terms are used for convenience in referring to the various details of the invention. These terms, however, are to be interpreted as broadly as the state of the art will permit.

In the drawing, Fig. 1 shows a desiccator stopper comprising a transparent top or dome portion 5 and a cylindrical skirt portion 6 which is internally threaded at 7 to mate with the external threads 8 on the neck of a container such as a conventional Mason jar 9.

In the embodiment illustrated, the dome 5 of the stopper is integral with the skirt 6 and a circular internal ledge 10 is formed at their juncture. A fine mesh foraminous plate or screen 12 is clamped against the ledge 10 by a rigid spider 13 which, in turn, is secured in place by an annular channel-shaped valve seat 14 and a snap ring 15 sprung in an internal groove 16 in the skirt 6 of the stopper.

The dome 5 of the stopper contains a hygroscopic material such as comminuted silica gel 17 which is confined therein by the screen 12. The material 17 is preferably a well-known indicating type of silica gel which is pink when saturated with moisture and blue when dry. The color of the material is visible through the transparent dome 5 of the stopper.

The valve mechanism for opening and closing the dome 5 of the stopper includes a flexible bimetallic disc 18, the properties of which are hereinafter more fully described, and a spring metal spider 19, the said members 18 and 19 being secured together and to the hub 20 of rigid spider 13 by a rivet 21 and spacers 22. The disc 18 spans the channeled area of the annular valve seat 14 and may either be raised off said valve seat to admit air to the dome 5 as shown in Fig. 1, or else seated on said valve seat to close the dome 5 off from the outside air as shown in Fig. 2.

The spring metal spider 19 has depending fingers 23 which extend outwardly beneath the snap ring 15 on the inner peripheral wall of skirt portion 6 of the stopper, so that said fingers 23 will engage the outer annulus or pouring lip 24 of the jar 9 when the stopper is screwed down on the neck of the jar as shown in Fig. 1. When the stopper is thus secured on the neck of the jar 9, the depending fingers 23 of spider 19 will be forced upwardly against the snap ring 15 and the central arms of said spider 19 will engage the disc 18 and raise it off the valve seat 14, thereby admitting air from the jar 9 to the dome 5 as indicated by the arrows in Fig. 1. It will thus be seen that the desiccant 17 will attract and absorb moisture from the contents of the jar 9 when the stopper is secured on the jar.

However, when the stopper is removed from the jar, as shown in Fig. 2, the spider fingers 23 will drop due to the spring flexure of spider 19, thus allowing the disc 18 to engage the valve seat 14 and sealing the dome 5 off from the outside air. This prevents the desiccant 17 from absorbing moisture from the outside atmosphere when the stopper is off the jar.

In use, the condition of the desiccant 17 is always evident by its color which is visible through the transparent dome 5 or by its weight. When the desiccant is blue its condition is satisfactory, but when it changes to pink, this indicates that the material has absorbed its capacity of moisture and that it should be revivified. This is accomplished by removing the stopper from the jar and placing it in an oven. When the stopper is thus removed from the jar, the bimetallic disc 18 which constitutes a thermostatic valve engages the valve seat 14 and seals off the dome 5, as previously described. However, the construction of the disc 18 is such that the high temperature of the oven flexes said disc to the position shown in Fig. 1, thereby opening the dome 5 of the stopper to the atmosphere of the oven. The moisture is thus driven out of the desiccant 17 which thereupon turns blue again. When the stopper is removed from the oven and cooled, the disc 18 snaps down to its sealing position as shown in Fig. 2, and it will not reopen until the stopper is again secured on the jar as shown in Fig. 1. Obviously, the thermostatic valve may be replaced by a manually operated valve which is automatically opened or closed by contact with the jar as above described, but is opened manually for reactivation of the desiccant.

Although a specific embodiment has been shown and described herein for purposes of illustration, it will be evident to those skilled in the art that the invention is capable of various modifications and adaptations within the scope of the appended claims.

What is claimed is:

1. A desiccating stopper for jars and other containers, comprising a top containing a desiccant and a skirt for attachment to a container, a valve sealing the top of said stopper from said skirt and including thermo-sensitive means opening the valve automatically at elevated temperatures, and means in said stopper engageable with a cooperating container to open said valve.

2. A desiccating stopper for jars and other containers, comprising a top containing a desiccant and a skirt for attachment to a container, a foraminous screen between said skirt and top for confining said desiccant in the latter, a valve sealing the top of said stopper from said skirt and including thermo-sensitive means opening the valve automatically at elevated temperatures, and means in said stopper engageable with a cooperating container to open said valve.

3. A desiccating stopper for jars and other containers, comprising a transparent top for storing a desiccant and a skirt for attachment to a container, a foraminous screen between said skirt and top for confining the desiccant in the latter, an indicating desiccant in said top having the property of changing its appearance when saturated with moisture, a valve sealing the top of said stopper from said skirt including thermo-sensitive means opening the valve when heated, and means in said stopper engageable with a cooperating container to open said valve.

4. A desiccating stopper for jars and other containers, comprising a transparent top for storing a desiccant and a skirt for attachment to a container, a foraminous screen between said skirt and top for confining the desiccant in the latter, an indicating desiccant in said top having the property of changing its appearance when saturated with moisture, a valve in said stopper including a valve seat and a flexible bimetallic thermo-sensitive disc flexed to engage said valve seat to seal off the top of said stopper from said skirt, said disc being adapted upon heating to flex out of engagement with said valve seat, and means in said stopper engageable with a cooperating container for moving said disc off said valve seat.

5. A desiccating stopper for jars and other containers, comprising a transparent top for storing a desiccant and a skirt for attachment to a container, a foraminous screen between said skirt and top for confining the desiccant in the latter, an indicating desiccant in said top having the property of changing its color when saturated with moisture, a valve in said stopper including an annular valve seat and a flexible bimetallic disc flexed to engage said valve seat to seal off the top of said stopper from said skirt, and means cooperating with said disc and engageable with the top of a container to move said disc off said valve seat and thereby admit air to the top of said stopper, said bimetallic disc being adapted upon heating to flex out of engagement with said valve seat to admit drying air to the top of said stopper.

6. A desiccating stopper for jars and other containers, comprising a transparent top for storing a desiccant and a cylindrical skirt for attachment to a container, a foraminous screen between said skirt and top for confining the desiccant in the latter, an indicating desiccant in said top having the property of changing its color when saturated with moisture, a valve in said stopper including an annular valve seat and a flexible bimetallic disc flexed to engage said valve seat to seal off the top of said stopper from said skirt, and a flexible spider secured to said disc and having depending fingers positioned to engage the top of a cooperating container to flex said disc off said valve seat and thereby admit air to the desiccant in the top of said stopper, said bimetallic disc being adapted upon heating to flex in a direction to disengage said valve seat to admit drying air to the top of said stopper.

7. In a desiccator including a container having a wall defining a top opening, a desiccating stopper for said container, comprising a transparent top for storing a desiccant and a cylindrical skirt for sealing attachment to said walls, a foraminous screen between said skirt and top for confining the desiccant in the latter, a desiccant in said top, a valve in said stopper including an annular valve seat and a flexible disc flexed to engage said valve seat to seal off the top of said stopper from said skirt, and a flexible spider secured below said disc having depending fingers positioned to engage the top of said container wall and intermediate parts positioned to flex said disc off said valve seat and thereby admit air to the desiccant in the top of said stopper.

FRED WALLER.

REFERENCES CITED

The following references are of record in the file of this patent:

UNITED STATES PATENTS

| Number | Name | Date |
|---|---|---|
| 1,628,108 | Brown | May 10, 1927 |
| 2,315,049 | Cronstedt | Mar. 30, 1943 |